US008555756B2

(12) United States Patent
Arana Beobide et al.

(10) Patent No.: US 8,555,756 B2
(45) Date of Patent: Oct. 15, 2013

(54) MACHINE AND METHOD FOR MACHINING LARGE CRANKSHAFTS

(75) Inventors: Pedro María Arana Beobide, Asteasu (ES); Eneko Arana Urquia, legal representative, Asteasu (ES); Juan Jose Dravasa Gurruchaga, Asteasu (ES); Pedro Ubarrechena Berasategui, Asteasu (ES); Ricardo Diego Garamendi, Asteasu (ES); Juan Osoro Echaniz, Asteasu (ES)

(73) Assignee: Bost Machine Tools Company, S.A. (ES)

( * ) Notice: Subject to any disclaimer, the term of this patent is extended or adjusted under 35 U.S.C. 154(b) by 252 days.

(21) Appl. No.: 12/988,544

(22) PCT Filed: Apr. 21, 2008

(86) PCT No.: PCT/ES2008/000272
§ 371 (c)(1),
(2), (4) Date: May 11, 2011

(87) PCT Pub. No.: WO2009/130336
PCT Pub. Date: Oct. 29, 2009

(65) Prior Publication Data
US 2011/0203427 A1    Aug. 25, 2011

(51) Int. Cl.
*B23B 5/18*    (2006.01)
(52) U.S. Cl.
USPC .................. 82/1.11; 82/109; 82/142; 82/162; 451/49
(58) Field of Classification Search
USPC ........... 82/162, 157, 142, 148, 118, 106, 108, 82/109; 409/199, 219; 451/49, 251, 57
See application file for complete search history.

(56) References Cited

U.S. PATENT DOCUMENTS

| | | | | |
|---|---|---|---|---|
| 1,512,631 A | * | 10/1924 | Muller | 82/19 |
| 1,717,047 A | * | 6/1929 | Litvinas | 82/129 |
| 1,760,530 A | * | 5/1930 | Skidmore et al. | 82/106 |
| 1,983,286 A | * | 12/1934 | Godziewski | 451/222 |
| 2,525,945 A | * | 10/1950 | Ricordel | 74/409 |
| 4,375,670 A | * | 3/1983 | Kralowetz et al. | 700/164 |
| 4,779,495 A | * | 10/1988 | Berbalk | 82/106 |
| 5,275,072 A | * | 1/1994 | Schmid et al. | 82/164 |
| 5,531,631 A | * | 7/1996 | Judge | 451/5 |
| 6,149,503 A | * | 11/2000 | Laycock | 451/49 |

(Continued)

FOREIGN PATENT DOCUMENTS

EP    0385347 A2    9/1990
EP    0403843 A2    12/1990

(Continued)

*Primary Examiner* — Daniel Howell
*Assistant Examiner* — Nicole N Ramos
(74) *Attorney, Agent, or Firm* — Cantor Colburn LLP

(57) ABSTRACT

Machine and method for machining large crankshafts, which allows simple and reliable synchronization of the rotation of said crankshafts (14) at all points, where said machine has a machining tool (1) configured to move along at least one guide (2) between a first end supporting element (3) and a second end supporting element (4), comprising a first electronic angular position sensor (6) situated on a first rotation shaft (7) of said first end supporting element (3), also comprising a second electronic angular position sensor (8) located on a second rotation shaft (9) of said second end supporting element (4), so that the rotational movement of said first end supporting element (3) is electronically synchronized with the rotational movement of said second end supporting element (4) at all times during the machining of the crankshaft (14).

4 Claims, 4 Drawing Sheets

(56) References Cited

U.S. PATENT DOCUMENTS

| | | |
|---|---|---|
| 6,333,615 B1 | 12/2001 | Maezawa et al. |
| 7,395,743 B2 * | 7/2008 | Kato ................................ 82/148 |
| 2005/0081351 A1 | 4/2005 | Robotta et al. |

FOREIGN PATENT DOCUMENTS

| | | | | |
|---|---|---|---|---|
| EP | 557969 | A1 | * | 9/1993 |
| EP | 0952504 | A2 | | 10/1999 |
| GB | 1218300 | A | * | 4/1969 |
| GB | 1218300 | A | | 1/1971 |
| JP | 51129988 | A | * | 11/1976 |
| JP | 57107703 | A | * | 7/1982 |
| JP | 2001062673 | A | | 3/2001 |
| JP | 2002239873 | A | | 8/2002 |
| JP | 2004261935 | A | * | 9/2004 |
| JP | 2006102879 | A | * | 4/2006 |

* cited by examiner

MACHINE AND METHOD FOR MACHINING LARGE CRANKSHAFTS

TECHNICAL FIELD OF THE INVENTION

This invention can be employed in the equipment and machinery industry for machining large crankshafts, for example, in the ship building industry.

BACKGROUND OF THE INVENTION

Currently, the machines used for machining large crankshafts comprise a machining tool with a displacement running the length of the crankshaft undergoing machining. Likewise, the machine comprises two end supporting elements, usually called the headstock and the tailstock, which hold the crankshaft at its ends and which also exert torque oriented according to a central axis of the crankshaft, transmitting thereto a rotational movement on its axis that allows the machining tool to machine the whole outer surface of the crankshaft, by means of parallel movement to said central axis or trunnion, in accordance with the same operational principle as a lathe.

This equipment and machines for the machining of large crankshafts allow the whole crankshaft to be machined, with the exception of the ends, given that said ends correspond to the areas where the crankshaft is anchored to the plates of the end supporting elements of the machine. Normally, said ends of the crankshaft are machined at a later stage, using for this equipment other than crankshaft machining equipment, and for this reason the crankshaft is always supported by end supporting elements during its machining.

With this kind of large crankshafts, during the machining of the crankpins, as a result of the fact that the crankpin shafts are not contained on the central axis of the crankshaft whereby it is anchored to the end supporting elements of the machine, a great deal of shear stress is produced in the crankshaft, which, because it is not a rigid piece, result in excessive distortion of the crankshaft, which, in many cases, prevents suitable machining tolerance from being reached, producing vibrations in the crankshaft that hinder the machining process, for example roughing, in optimum conditions for achieving a low cycle time.

With the aim of resolving the abovementioned drawback, the machines for machining this kind of crankshaft include a central or intermediate supporting element, commonly called a motorised steady rest, which allows the crankshaft to be supported in the centre and exert, like the headstock and tailstock, torque oriented according to the central axis of the crankshaft, transmitting thereto a rotational movement on its own axis.

In order to machine the whole surface of the crankshaft, said intermediate supporting element must be able to change position, changing its anchoring point to the crankshaft by shifting from one supporting element to another and allowing the machine to machine the supporting element whereby the intermediate supporting element was anchored, thereby machining the whole crankshaft.

Likewise, there are machines that comprise other types of intermediate supporting elements that do not transmit rotation to the crankshaft, thereby serving to avoid excessive distortion to the crankshaft during its machining as a result of the action of its own weight or the stress that is produced during said machining operations. These steady rests allow machining to be carried out with greater precision, but have the drawback that they constitute a reaction that results in an application of additional torsion actions on the crankshaft.

Bearing this negative side effect in mind, a determining factor in avoiding excessive stress on the crankshaft, especially at moments of excessive torsion, is that the crankshaft's rotation should be perfectly synchronised, both at the ends, i.e. the headstock and the tailstock, and in the areas of the intermediate steady rests.

Usually, these machines consist of a headstock, a tailstock and a motorised steady rest in an intermediate position, so that these three supporting points hold and transmit rotational movement to the crankshaft. In view of this embodiment, it can be clearly seen here that the rotational movements transmitted by each of these three elements can generate torsion stress in the crankshaft that may result in excessive distortion thereof if they are not perfectly synchronised. For this reason, in order for machining to be achieved properly on the crankshaft, it is important that the rotation of these three elements are synchronised.

Currently, there are means of synchronising rotational movement at the end supporting elements and the motorised steady rest of these machines for machine crankshafts. Said means of synchronisation consists of a set bar located between the headstock and the tailstock that allow the rotational movement of the headstock to be linked to the rotational movement of the tailstock, for which purpose the bar is of an equivalent length to the distance between end supporting elements of the machine.

In turn, to connect the set bar to the motorised steady rest there is a clutch mechanism that allows the bar to be engaged with the steady rest for the transmission of movement, so that the rotation of said mechanism, and therefore the steady rest's rotation, and the rotation of both the headstock and the tailstock are in synchrony with the rotation of the bar. On the other hand, the clutch mechanism allows the set bar to be disengaged when the position of the motorised steady rest has to be changed, as this rest is not in a fixed position in relation to the crankshaft throughout the machining process, as explained above.

In this way, by joining the motorised steady rest to the bar, the rotation motor of the steady rest is built into to the rotation motor of the headstock, and therefore the result is the same as having two motors connected together in series to rotate the crankshaft. If the bar has two motors in series, one located in the headstock and the other in the tailstock, the effect is equivalent to having a third motor in series, when the bar is engaging with the motorised steady rest.

The main drawback of this synchronisation system is that, given the great length of the crankshaft, it is difficult to perfectly synchronize the rotation of the end supporting elements, generating excessive torsion stress on the crankshaft, in addition to it being a mechanical synchronisation system, excessively complicating the manufacture and operation of the machine, being very unreliable and considerably increasing its complexity. Likewise, these synchronisation means has serious operational disadvantages resulting from the fact that the bar has to be engageable and disengageable to the motorised steady rest in order to allow said rest to move along the whole crankshaft in different supporting elements.

DESCRIPTION OF THE INVENTION

A first aspect of this invention relates to a machine for machining large crankshafts and a second aspect relates to a method of machining said crankshafts, by means of this machine, allowing for an electronic crankshaft rotation synchronisation system of the crankshaft being machined, preferably at different points on said crankshaft, dispensing with the need to use complex mechanical elements such as set bars or complex mechanical systems with gears and clutches, to achieve a perfect synchronisation of the movement of the end supporting elements of the crankshaft, as well as the movement of the motorised steady rest, if present.

The machine for machining large crankshafts that the invention proposes comprises a machining tool configured to move along at least one guide between a first end supporting element, called the headstock, and a second end supporting element, called the tailstock, where said end supporting elements are configured to anchor and transmit rotational torque to each end of the crankshaft.

In accordance with the invention, the machine comprises an electronic angular position sensor located on a first rotation shaft of the first end supporting element, preferably on the free end of said first rotation shaft.

In addition, the machine has a second electronic angular position sensor located on a second rotation shaft, preferably at the free end thereof, of the second end supporting element, so that the rotational movement of the first end supporting element is synchronised with the rotation movement of the second end supporting element; for this purpose, electronic means can be used to synchronise the signals from the electronic angular position sensors and the actuation on the driving means of each end supporting element independently, for example through the use of a numerical control of the machine, allowing the electronic synchronisation of the crankshaft's rotation. According to the preferred embodiment of the invention, these electronic angular position sensors can consist of rotational drive sensors.

To achieve synchronisation, the rotational movement sensors are directly incorporated on the shaft of the first end supporting element and another directly on the axis of the second end supporting elements, so that a direct measurement can be taken of the angular position of the shafts of the headstock and the tailstock, so that the degree of torsion that the rotation of these elements exerts on the crankshaft that is attached between them is known at all times.

Likewise, it is considered that the machine comprises alarm means that will allow for the deactivation thereof, or at least the stoppage of the driving means of the crankshaft supporting elements, when a specific difference in synchronisation of the crankshaft's rotation at each of its end supporting elements is exceeded, with the aim of avoiding excessive stress on the part.

The invention will possibly also comprise at least one intermediate supporting element, or steady, configured to move between said first end supporting element and said second end supporting element. According to a preferred embodiment, the machine comprises an intermediate supporting element consisting of a motorised steady rest configured to receive the support of a central span of the crankshaft being machined and transmit rotational movement thereto.

Likewise, it is planned that at least one motorised steady rest comprises an intermediate electronic angular position sensor configured to allow the rotational movement of said motorised steady rest to be synchronised with the movement of the end supporting elements, for example, through the control module of the machine.

According to a preferred embodiment of the invention, the end supporting elements and at least one intermediate supporting element each comprise a motor configured to rotate independently, so that each supporting element comprises means of rotational transmission by means of tangential engagement to the rotation shaft of the crankshaft undergoing machining, said transmission means preferably including two worm gears for a tangential rotational gearing, per supporting element, said worm gears being configured to rotate a crown gear, transmitting its rotational movement directly to each crankshaft supporting element. A worm gear is defined as any axis having a helicoidal thread on its external surface.

To be able to include the position sensors on the respective rotation shafts of the first and second end supporting elements, the rotation transmission system tangentially gears to the shafts so that the ends of the shafts are free to be aligned with the position sensor. The transmission system could, for example, be a double worm and crown gear transmission system.

There is a possibility that at least one central electronic angular position sensor is placed on a tangential engagement rotation worm gear.

In the event that the motorised steady rest or steady, which does not have an axis that directly produces rotation due to it being a hollow part wherein to the crankshaft is inserted, an indirect measurement of the rotation position is obtained in one of the worm gears fitting into the crown gear that transmits rotation to the crankshaft.

On the other hand, a second aspect of the invention relates to a method of machining large crankshafts, by means of the use of a machine for machining crankshafts similar to the one described above.

Therefore, in accordance with the invention disclosed, the machine and the method for machining large crankshafts proposed by the invention are an advance in the machines and machining methods used up to now, and completely solve the problems outlined above in a satisfactory manner by permitting the synchronisation of rotational movement of the crankshaft undergoing machining at different points along said crankshaft, dispensing with the need to use complex mechanical elements, such as set bars, gears and clutches, achieving a perfect synchronisation of movement of the supporting element ends, as well as of the movement of the motorised steady rest.

The machine allows the integration of a system of rotational measurement in each of the supporting elements with the necessary precision to synchronise the rotation of the headstocks corresponding to said supporting elements without twisting the crankshaft. This integration can be carried out directly by means of two rotating sensors located on the shafts of the headstock and the tailstock and a rotating position sensor located in the worm gear fitting into the motorised steady rest, allowing the numerical control of the machine to know the angular position of each of the three supporting elements with great accuracy, more than 20,000 positions per rotation in each of the headstocks. All of this is integrated in a position synchronism loop of a current numerical control which allows electronic synchronisation with the total guarantee that the crankshaft will not be twisted.

Among the invention's technical advantages in comparison with the state of the art are the following aspects:

The entire mechanical system of string rods and its system of engaging in the steady is eliminated, thereby simplifying the mechanics of the machine and therefore increasing its reliability.

It allows the motorised steady rest to be released from the crankshaft at any time and attached at a different point at the same angular position, or at a different one, as the angular position of the rest is known at all times, irrespective of whether it is electronically synchronised or rotating independently.

Another important advantage is that, depending on the distribution of shear stresses, the position of the ends can be synchronised independently according to the torque of each of the motors, so that in the case of stress occurring near to the headstock, more torque is transmitted with its motor, and, in turn, the steady transmits less torque than the tailstock, as only the torque necessary to maintain the same angle position in the three supporting elements is transmitted. In this way, the supporting element that receives most resistance in the case of machining near to the headstock is the headstock's rotation motor. Conversely, in the current state of the art, where synchronisation is performed by means of the bar, depending on the torsions and the position of said bar and the stresses, a misalignment of position occurs due to the differences in torsion and the rigidity in each position where stress occurs.

One advantage of the invention is that it allows us to know the angular position directly for each of the three supporting elements, and therefore allows the incorporation of a position monitoring system operationally linked to alarm means configured to deactivate the machine should there be a position misalignment beyond a specific level gauged parametrically within the control module of the machine, and which can even be regulated depending on the tolerances of each particular crankshaft.

DESCRIPTION OF THE DRAWINGS

In order to complement this description being made and to achieve a better understanding of the invention's characteristics, in accordance with a preferred practical embodiment thereof, a set of drawings is attached as an integral part of said description, wherein the following has been represented in an illustrative and non-limitative manner.

PREFERRED EMBODIMENT OF THE INVENTION

Figure 1:
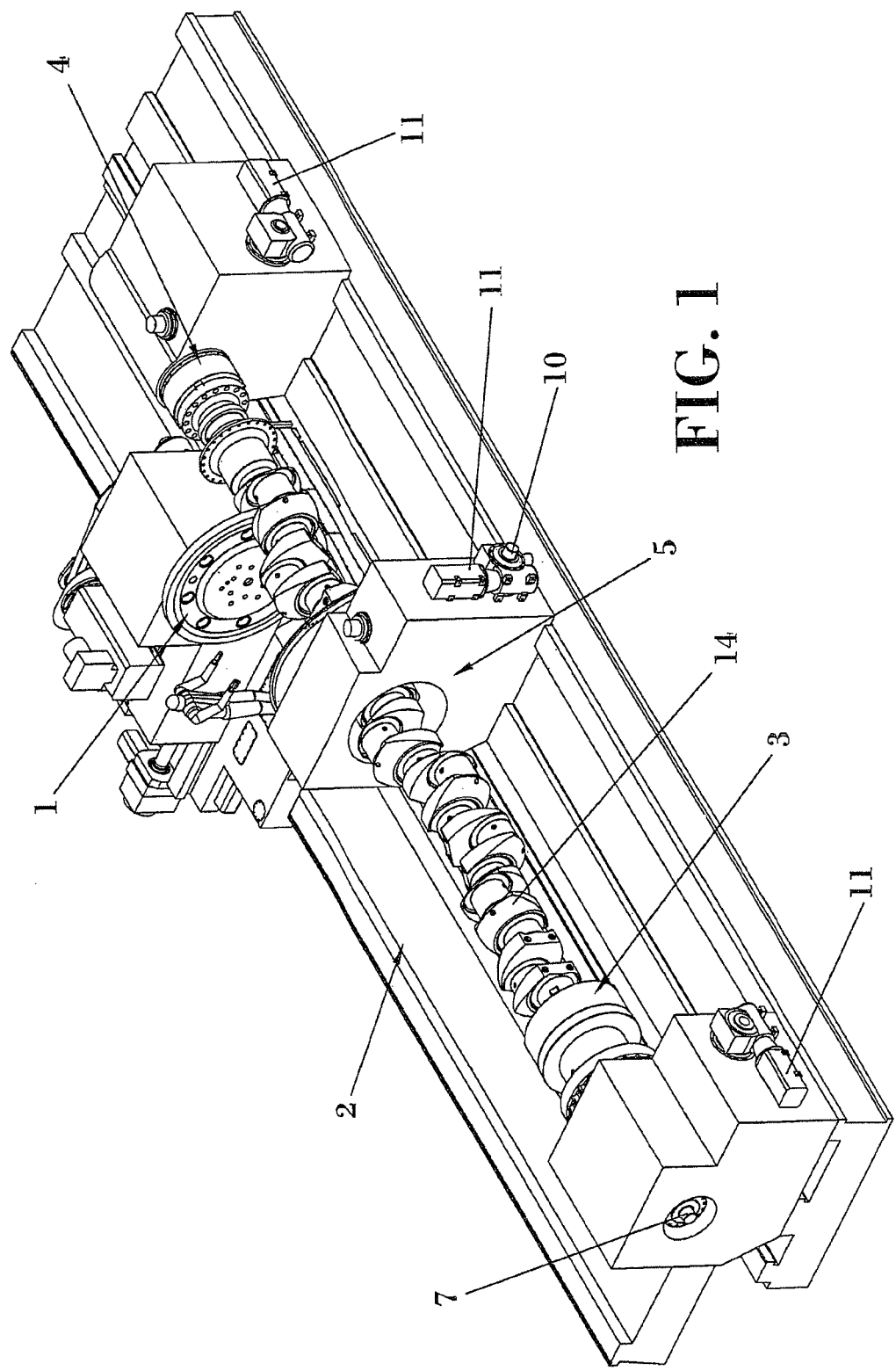
FIG. 1. Shows a schematic perspective view of a preferred embodiment of the machine for machining large crankshafts, wherein a motorised steady rest located between the headstock and the tailstock, as well as several operators, can be observed, giving an idea of the machine's dimensions.
Figure 2:
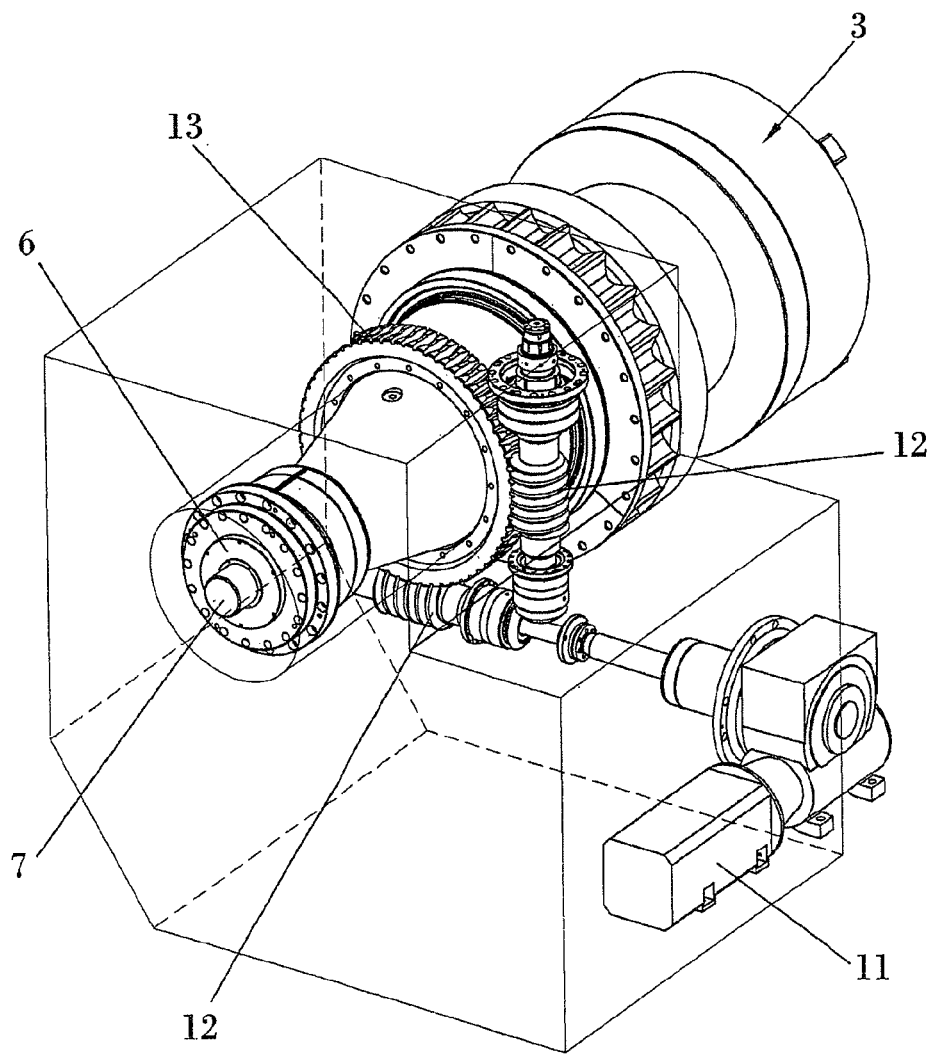
FIG. 2. Shows a perspective detail of the headstock of the machine, where the two worm gears for transmission of rotation to the crown gear of the rotation shaft of said headstock can be observed. The external elements of the headstock are shown as transparent in order to make the rotation transmission mechanisms more clearly visible.
Figure 3:
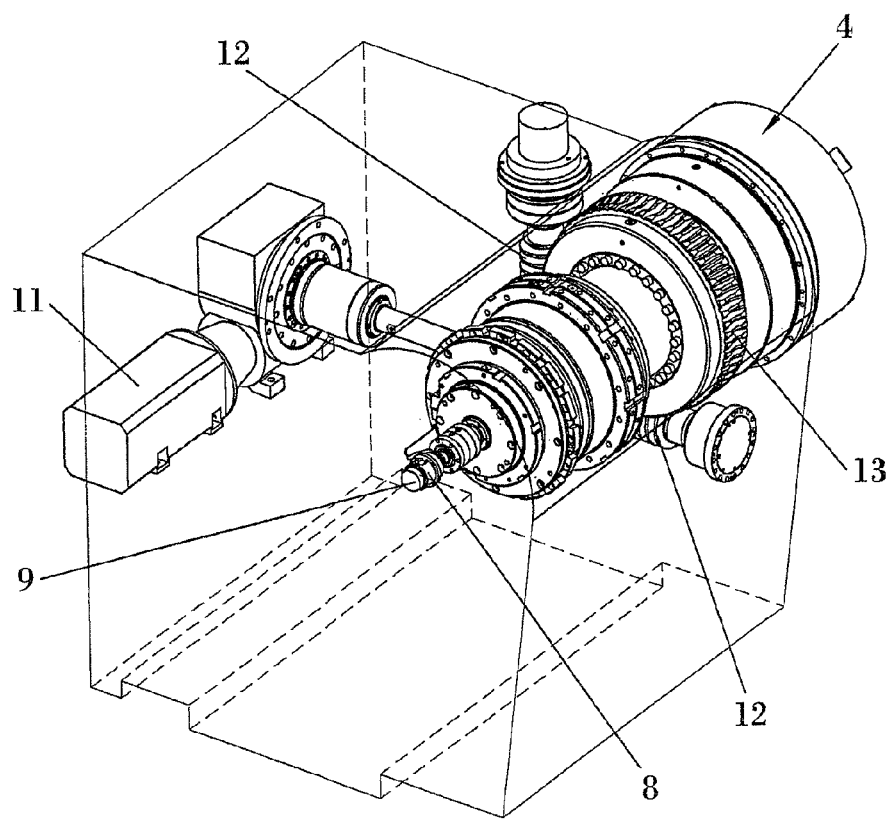
FIG. 3. Shows, in the same way as FIG. 2, a perspective detail of the machine tailstock.
Figure 4:
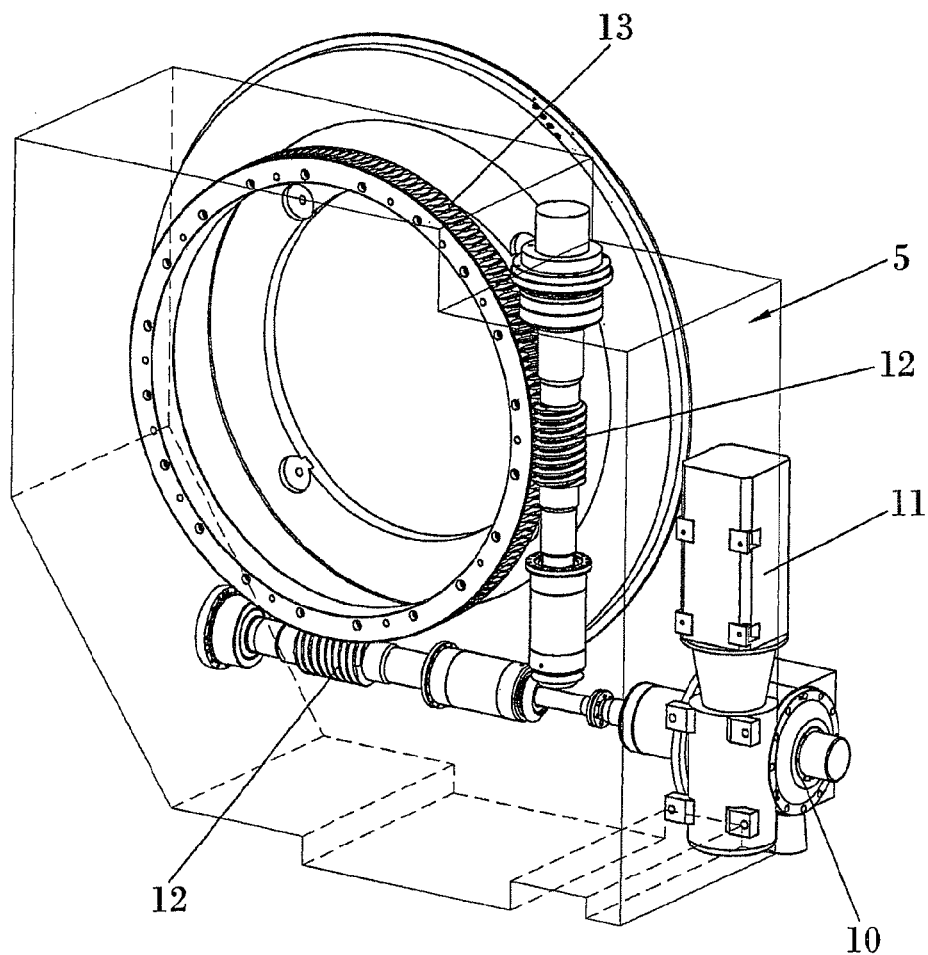
FIG. 4. Shows a perspective detail, as in FIGS. 2 and 3, of the motorised steady rest which comprises said preferred embodiment of the machine, wherein the addition of an electronic angular position sensor at the end of one of the worm gears of one of the means of rotational transmission which comprises said motorised steady rest can be observed.

In view of said figures, it can be observed that in one of the possible embodiments of the invention, the machine for machining large crankshafts proposed by the invention comprises a machining tool (1) configured to move along a guide (2) between one end supporting element (3), called headstock, and a second end supporting element (4), called tailstock, where said end supporting elements (3, 4) are configured to attach and transmit a rotation torque to each end of the crankshaft (14).

The machine comprises a first electronic angular position sensor (6), located on the first rotation shaft (7) of the first end supporting element (3), and a second electronic angular position sensor (8) located on a second rotation shaft (9) of the second end supporting element (4), so that the rotation of said first end supporting element (3) is synchronised with the rotation of the second end supporting element (4), whereby electronic means are used to synchronise the signals originating from the electronic angular position sensors and the effect on the driving means of each end supporting element (3, 4) independently, by means of the use of the machine's control module. Said electronic angular position sensors consist of rotational drive sensors.

Likewise, the machine comprises alarm means which allow deactivation of the machine when a specific difference in synchronisation of the crankshaft's (14) rotation is exceeded at each of its end supporting elements, with the aim of avoiding excessive stress on said crankshaft.

In addition, the machine also has an intermediate supporting element (5), consisting of a motorised steady rest configured to receive the support of the central span of the crankshaft (14) being machined and to transmit a rotational movement to said crankshaft (14), where said intermediate supporting element (5) is configured to move between said first end supporting element (3) and said second end supporting element (4).

The motorised steady rest has an intermediate electronic angular position sensor (10) configured to allow the rotational movement of said motorised steady rest to be synchronised with the movement of the end supporting elements (3, 4), via the machine's control module.

The end supporting elements (3, 4) and the intermediate supporting element (5) each comprise a motor (11) configured to rotate independently, so that each supporting element (3, 4, 5) comprises means of rotational transmission by means of tangential engagement with the rotation shaft of the crankshaft (14) being machined, said means of transmission comprising two tangentially engaging rotation worm gears (12) per supporting element (3, 4, 5) configured to rotate a crown gear (13), which transmits its rotation directly to each supporting element (3, 4, 5) of the crankshaft (14). The intermediate electronic angular position sensor (10) is located on a tangentially engaging rotation worm gear (12).

In light of this description and the accompanying set of figures, a person skilled in the art will be able to understand that the embodiments of the invention disclosed can be combined in multiple ways within the object of the invention. The invention has been described according to some of the preferred embodiments thereof, but for a person skilled in the art, it will be clear that multiple versions may be introduced within said preferred embodiments without exceeding the object of the invention claimed.

The invention claimed is:

1. Machine for the machining of large crankshafts, which allows the synchronisation of a rotation movement of said crankshaft (14), and comprises a machining tool (1) configured to move along at least one guide (2) between a first end supporting element (3) and a second end supporting element (4), where said end supporting elements (3, 4) are configured to anchor and transmit rotational torque to each end of the crankshaft (14), characterized in that it comprises a first electronic angular position sensor (6) situated on a first rotation shaft (7) of said first end supporting element (3), also comprising a second electronic angular position sensor (8) located on a second rotation shaft (9) of said second end supporting element (4), so that the rotation of said first end supporting element (3) is synchronised with the rotation of said second end supporting element (4), and in that it further comprises at least one intermediate supporting element (5) configured to move between said first end supporting element (3) and said second end supporting element (4), wherein said at least one intermediate supporting element (5) consists of a motorized steady rest configured to support the crankshaft (14) undergoing machining and to transmit a rotational movement to said crankshaft (14), wherein said at least one motorised steady rest comprises an intermediate electronic angular position sensor (10) configured to allow the rotational movement of said motorised steady rest to be synchronised with the movement of the end supporting element (3, 4) wherein said at least one intermediate supporting element (5) comprises a motor (11) configured to rotate independently, comprising means of rotational transmission by tangential engagement with the rotation shaft of the crankshaft (14) being machined, wherein the means of rotational transmission comprises two tangentially engaging rotation worm gears (12), configured to rotate a crown gear (13), and wherein said intermediate electronic angular position sensor (10) is situated on one of said tangentially engaging rotation worm gears (12).

2. Machine for the machining of large crankshafts, according to claim 1, characterized in that also each of the end supporting elements (3, 4) comprises a motor (11), configured to rotate independently, comprising means of rotational transmission by tangential engagement with the rotation shaft of the crankshaft (14) being machined.

3. Machine for the machining of large crankshafts, according to claim 2, characterized in that the means of rotational transmission comprises two tangentially engaging rotation worm gears (12) for each supporting element (3, 4) configured to rotate a crown gear (13).

4. Method for the machining of large crankshafts, including the following steps providing at least one guide disposed between a first end supporting element and a second end supporting element, wherein the end supporting elements are configured to anchor and transmit rotational torque to each end of the crankshaft, providing a first electronic angular position sensor disposed on a first rotation shaft of the first end supporting element and a second electronic angular position sensor disposed on a second rotation shaft of the second end supporting element, rotating the first end supporting element in synchronization with the rotation of the second end supporting element, providing at least one intermediate supporting element configured to move between the first end supporting element and the second end supporting element, wherein the at least one intermediate supporting element includes a motorized steady rest configured to support the crankshaft undergoing machining and to transmit a rotational movement to the crankshaft, and providing an intermediate electronic angular position sensor having a motor, configured to rotate independently, including means of rotational transmission by tangential engagement with the rotation shaft of the crankshaft being machined, wherein the means of rotational transmission includes two tangentially engaging rotation worm gears, configured to rotate a crown gear, and wherein the intermediate electronic angular position sensor is situated on one of the tangentially engaging rotation worm gears, and synchronizing the movement of the end supporting element with the rotational movement of the motorized steady rest.

* * * * *